Patented Feb. 19, 1946

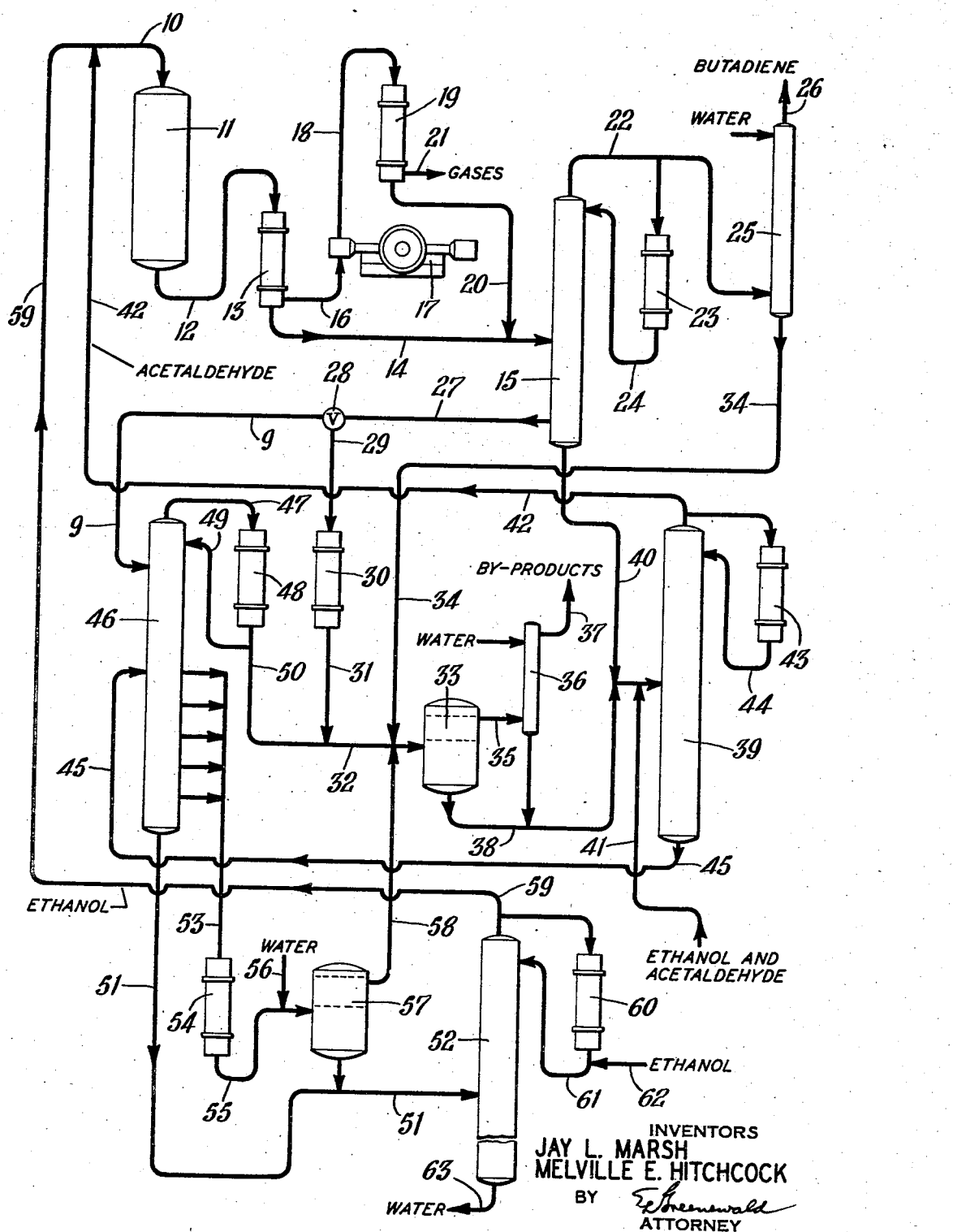

2,395,057

UNITED STATES PATENT OFFICE 2,395,057

RECOVERY METHOD IN PROCESS FOR MAKING BUTADIENE

Jay L. Marsh and Melville E. Hitchcock, South Charleston, W. Va., assignors to Carbide and Carbon Chemicals Corporation, a corporation of New York Application May 2, 1944, Serial No. 533,740

9 Claims. (Cl. 260—681)

The subject of this invention is an improved method for recovering unreacted materials and separating the products of side reactions in a cyclic process for making butadiene from ethanol and acetaldehyde.

The reaction of acetaldehyde and ethanol in the presence of suitable catalysts to produce butadiene has been the subject of academic investigation for many years, and the development of improved catalysts has permitted the process to be operated commercially. In the present state of the art, however, no catalyst of sufficient selectivity is known which does not also exert a secondary action on the ethanol and acetaldehyde to convert them to side reaction products. The principal side reaction which occurs is the dehydration of ethanol to diethyl ether, although esters, liquid hydrocarbons and higher aldehydes are also produced as the result of more complex side reactions.

The products from the butadiene converter contain butadiene, ethanol, acetaldehyde, hydrocarbon gases and the side reaction products discussed above (hereinafter termed "by-products"). Butadiene may be separated readily from the other reaction products by a combination of condensation, scrubbing and distillation processes, but the recovery of acetaldehyde for recycling and the removal of by-products has proven difficult. When the mixing remaining from the separation of butadiene is fractionally distilled, and an attempt is made to separate acetaldehyde, the most volatile major component, such by-products tend to accumulate in the acetaldehyde distillate in an increasing degree until it may become necessary periodically to discard a large amount of material from the cycle to reduce the concentration of by-products. The recovery of acetaldehyde and ethanol from such discarded material by fractional distillation presents much the same problem. Also, when the by-products are recycled in large amounts, they cause a reduction in the production of butadiene through dilution of the reactants. Furthermore, when recycled in large quantities, some of the by-products may react with ethanol or acetaldehyde, which reduces the chemical efficiency of the process. Finally, in these quantities, certain of the by-products exert a harmful action on the catalyst, reducing its effectiveness by depositing excessive carbonaceous material thereon, thus necessitating more frequent reactivations of the catalyst and reducing its availability for the production of butadiene.

The complexity of this problem is increased by the fact that acetaldehyde forms an azeotropic mixture with diethyl ether, boiling at about 57° C. under a pressure of 40 p. s. i. gauge. At these temperatures and pressures, the azeotrope contains about 75% acetaldehyde by weight. However, this azeotrope cannot be continuously generated in a column for recovering acetaldehyde from the remainder of the reaction products from the butadiene converter after removal of the butadiene, when the base temperature is sufficiently high, about 120° C., to volatilize all the acetaldehyde from the base of the column. Under such conditions, the by-products, including additional diethyl ether, tend to distill over with the acetaldehyde-diethyl ether azeotrope in such quantities that the concentration of acetaldehyde in the distillate from the column has been reduced at times to as low as 50% by weight. In part, this may be caused by a steam distillation of the by-products, because of their insolubility in the mixture of water and ethanol at the base of the column.

By means of this invention, acetaldehyde vapors of a higher purity than fixed by the constant boiling mixture of acetaldehyde and diethyl ether are continuously recovered from the remainder of the reaction products from the butadiene converter after separation of the butadiene. In accordance with this invention, the vapors leaving the chamber containing the butadiene catalyst are first treated to recover the butadiene. This may be done by condensing the vapors and distilling butadiene from the condensate. Some butadiene will be present in the non-condensible gases, and such butadiene may be recovered by scrubbing the gases with a solvent, such as ethanol, and combining the scrubber residue with the feed to the distillation column for separating butadiene. Part of the ethanol consumed in the butadiene reaction may be introduced as such scrubbing liquid. The butadiene vapors from the distillation column contain a small amount of acetaldehyde, and such acetaldehyde may be separated from the butadiene vapors by scrubbing the vapors with water.

According to this invention, sufficient by-products are removed from the cyclic system before distilling acetaldehyde from the recovered products so that a distillate containing acetaldehyde of high purity may be obtained by rectification. This is accomplished by concentrating the by-products in the lower part of the butadiene column, and withdrawing such by-products either in the liquid or vapor phase, preferably the latter, at this point to effectively reduce the concentration of by-products in the residue from the still.

The by-product fraction withdrawn from the butadiene column contains a substantial amount of acetaldehyde, although the ratio of acetaldehyde to by-products is much lower than it is in the feed to the column, and such acetaldehyde is recovered and returned to the main stream of acetaldehyde-bearing products. One means of accomplishing this is to wash the by-product fraction with successive amounts of water, or continuously to extract the acetaldehyde from the by-product fraction with water. Although process water may be introduced for these operations, a dual washing effect with a net heat economy in the distillation system is obtained by employing as at least part of the washing liquid, the dilute aqueous solution of acetaldehyde discharged from the butadiene scrubber. The aqueous layer from the washing operation passes to the acetaldehyde distillation column together with the residue from the butadiene column, and the by-products layer is collected for further treatment to recover diethyl ether if desired.

Sufficient amounts of the more volatile by-products are removed in this manner, to permit acetaldehyde vapors of 85 to 90% purity by weight to be obtained from the acetaldehyde column for recycling through the butadiene converter. The principle of the invention involves concentrating a fraction in the butadiene column preceding the acetaldehyde column, at a point below the feed point and above the point of residue removal, in which the ratio of diethyl ether to acetaldehyde is substantially greater than is contained in their azeotrope at 57° C. and 40 p. s. i. gauge, i. e., is substantially greater than 1:3, and is preferably at least 1:1 by weight. Sufficient amounts of such fraction are usually withdrawn so that the ratio of acetaldehyde to diethyl ether in the residue from the butadiene column is at least as great and preferably higher than the azeotropic ratio at 57° C. and 40 p. s. i. gauge.

The by-products which are less volatile than the by-products withdrawn from the butadiene column are present in the residue from the acetaldehyde column, and such less volatile by-products may be removed from this residue in a separate by-products column by distilling them as an overhead vapor, condensing the vapor, and washing the condensate with water, either separately or in admixture with the by-product fraction withdrawn from the butadiene column. By-products may also be withdrawn from the lower part of the column which continuously separates by-products as an overhead fraction. These by-products are associated principally with ethanol. They may be washed with water, and the aqueous layer, together with the residue from the by-products distillation, fractionated to separate ethanol from water. At least part of the recovered ethanol is recycled over the butadiene catalyst.

Suitable operating conditions for carrying out the recovery method will now be described with reference to the attached drawing.

Ethanol and acetaldehyde vapors, for instance in the molar ratio of about 3:1, are introduced through pipe 10 to a converter 11 containing a catalyst of an appropriate type at a temperature of about 300° to 350° C. An improved catalyst is described in W. J. Toussaint and J. T. Dunn application Serial No. 460,120, filed September 29, 1942. The reaction products leave the converter through pipe 12, and a part of these are condensed in a condenser 13. The condensate, including a substantial part of the butadiene, passes through pipe 14 to a fractionating column 15. The uncondensed reaction products pass through a pipe 16 to a compressor 17, where they are compressed to a pressure of about 55 p. s. i. The compressed gases pass through pipe 18 to condenser 19, and the condensate passes through pipe 20 to the butadiene distillation column 15. The gases leave the condenser through pipe 21, and they may be scrubbed with a solvent, such as ethanol, to recover the butadiene contained in such gases. The scrubbing liquid is distilled to separate the dissolved butadiene.

The butadiene still 15 may comprise a fractionating column having 54 plates and it may be operated at a head temperature of about 43° to 45° C. at a pressure of about 60 to 65 p. s. i. gauge. The butadiene is removed as a vapor through pipe 22, part of the vapor being passed through condenser 23 and the condensate returned through pipe 24 as reflux for the column. The reflux ratio employed in the column may vary from about 4:1 to about 12:1. The vapors from the still may contain about 90% butadiene, 5% acetaldehyde and 5% hydrocarbon gases by weight and they are conducted to the base of a scrubbing tower 25. Water is introduced at the top of the scrubber and, in descending through the column it dissolves the acetaldehyde from the ascending vapors. Butadiene of about 95% purity by weight is discharged from the top of the tower through pipe 26 for further purification according to known methods.

Substantially all the by-products of the butadiene reaction, except the most volatile, would normally be present in the residue from still 15, but it has been found that many of such by-products may be concentrated as a fraction in the lower part of the column, suitably on about the fourth to tenth trays. The composition of the vapor in the region of such trays may be about 45% diethyl ether, 35% acetaldehyde, 10% other by-products, 10% ethanol and miscellaneous constituents by weight. In accordance with our invention, a side stream is withdrawn from the column through pipe 27 and it may amount to about 5 to 10% by weight of the down-flowing liquids in the column at that point. The side stream may be withdrawn from either the vapor or liquid phase in the column, although it is preferably withdrawn in the vapor phase, because a somewhat higher concentration of the low-boiling by-products to be removed is present in the vapor phase. The temperature at the point of withdrawal may be about 98° C., although this varies with the temperature at the head or base of the column. At a pressure of about 60 to 65 p. s. i. gauge, the temperature at the base is about 112° C. The ratio by weight of acetaldehyde to diethyl ether in the feed to the column 15 may be about 2:1, and sufficient amounts of the above fraction are withdrawn so that the ratio by weight of acetaldehyde to diethyl ether in the residue from the column is at least about 3:1 and such ratio is preferably at least 4:1 or higher. A typical feed to the butadiene column may contain butadiene, 7%, ethanol, 57%, acetaldehyde, 14%, by-products, including diethyl ether, 8%, and water, 14%, by weight.

One method of treating the withdrawn side stream is to pass it by means of valve 28 and pipe 29 to condenser 30. The condensate is passed through pipes 31 and 32 to decanter 33, along with the scrubber residue from scrubber 25, the residue comprising a dilute aqueous solution of acetaldehyde containing about 1 to 2% acetaldehyde by weight, which solution is introduced to pipe 32 through pipe 34. The relative solubilities of acetaldehyde, diethyl ether, ethanol, water and other by-products are such that the mixture introduced into decanter 33 separates into two layers; a lower aqueous layer and an upper by-product layer containing an appreciable amount of acetaldehyde, depending on the relative volumes of by-products and aqueous scrubber residues which are mixed. From about 0.5 to about 2 volumes of water per volume of by-products to be washed are usually employed. When equal volumes are utilized, the ratio of the upper layer to the lower layer in the decanter is normally 1:3 by volume. In general, the greater the volume of water employed, the higher will be the percentage recovery of acetaldehyde, but the amount of by-products dissolved in the aqueous layer will be increased. The by-product layer is withdrawn through pipe 35 to a continuous extractor 36. Water is introduced at or near the top of this extractor and acetaldehyde is efficiently recovered from the by-product layer by extraction. The amount of water employed is preferably about equal in volume to the by-product layer being extracted. The percentage recovery of acetaldehyde effected through the batch washing and extraction described is about 98%.

The by-products are discharged through pipe 37, whereas the botttom layers from decanter 33 and extractor 36 pass through pipe 38 to distillation column 39 for the separation of acetaldehyde. The residue from the butadiene distillation is also fed to column 39 through pipe 40. In the particular embodiment of the invention involved, still 39 is also designed to separate acetaldehyde from ethanol and impurities which are formed when ethanol is converted to acetaldehyde according to well-known methods. Such a mixture may be introduced through pipe 41. However, the major part of the by-products is formed in the reaction of ethanol with acetaldehyde to produce butadiene, and the principles of the invention are applicable irrespective of the source of the acetaldehyde consumed in the process. The preceding steps described have resulted in the reduction of by-products in the feed to the acetaldehyde column 39 to less than the quantity required to form the azeotrope with acetaldehyde. Consequently, acetaldehyde vapors of about 85 to 90% purity or higher by weight may be generated as an overhead product from the column.

These vapors pass through pipe 42 and are recycled over the butadiene catalyst in the converter 11. Part of the aldehyde vapors are withdrawn to condenser 43 and the condensate returned through pipe 44 as reflux to the column. A reflux ratio of 2.5:1 to 4:1 is sufficient to maintain the above purity at a head temperature of about 57° to 58° C. at a pressure of 40 p. s. i. gauge.

The residue from the column 39 may be further treated to separate additional amount of by-products, and this may be effected by passing the residue through pipe 45 to another rectification column 46 of the continuous type. This by-products column may operate at a head temperature of about 75° to 80° C. and a base temperature of about 109° C. at a pressure of about 20 p. s. i. gauge. The by-products fraction is removed as an overhead vapor through pipe 47 and it is condensed in condenser 48, from which part of the condensate is returned through pipe 49 as reflux for the column.

The side stream withdrawn from the butadiene column 15 may, if desired, be introduced in the vapor phase near the top of the by-products column through pipe 9. The advantage of this procedure is that some of the ethanol may be separated from the withdrawn fraction before it is subjected to the washing operation. In either event, part of the condensate from condenser 48 is passed through pipe 50 to pipe 32 and subjected to the washing operation described. The recommended ratios of by-products to water in such washing operation are based on the total amount of by-products subjected to the washing procedure. Where sufficient aqueous scrubber residue is not available, additional process water may be supplied and, of course, process water may be used exclusively for the washing operation.

The residue from the by-products column passes through a pipe 51 to a column 52 for continuously recovering ethanol. Although not essential to the operation of the process, by-products may also be withdrawn from the taps shown in the drawing on the by-products column 46. The withdrawals may be either in the liquid or vapor phase, and the total amount withdrawn may comprise about 5 to 10% by weight of the total down-flow in the column. Such by-products are mixtures of ethanol with complex "oils," such as hexene, ethyl acetate, butyraldehyde, and other hydrocarbons, esters and alcohols. Such by-products may be passed through pipe 53 to condenser 54, and the condensate mixed in pipe 55 with about an equal volume of process water introduced through pipe 56. The mixture is passed to a decanter 57 where it separates into two layers. The ethanol is principally contained in the lower aqueous layer but some ethanol is present in the upper by-products layer, and such by-product layer is treated to recover the ethanol. This may be accomplished by returning the by-product layer through pipe 58 to the washing system described, employing decanter 33 and extractor 36. When this alternative is practiced, there should be a suitable increase in the amount of water employed in the washing operation. The return of these higher-boiling "oils" to the decanter in which the ether fraction from the butadiene forecolumn is washed reduces the amount of light by-products in such fraction which dissolve in the aqueous layer, because of the preferential solubility of the light by-products in the heavier "oils."

Three by-product fractions are produced by the hereindescribed process. One fraction is the diethyl ether fraction withdrawn from the butadiene column; the second fraction is the overhead vapor from the by-products column which contains ethyl acetate, butyl acetate, methyl ethyl ketone, butyraldehyde and other by-products and may contain diethyl ether when the ether fraction is passed to the column; the third fraction is the ethanol-"oil" fraction withdrawn from the taps in the lower part of the by-products column. Instead of commingling these fractions as shown, they may be worked up separately or in combination for the recovery of their values.

The aqueous layer from the decanter 57 passes through pipe 51 to the ethanol column 52. This column may operate at a head temperature of about 120° C. under a pressure of about 50 p. s. i. gauge and the ethanol vapors are conducted through pipe 59 for re-passage through the butadiene converter. When the acetaldehyde consumed in the process is produced by the dehydrogenation or oxidation of ethanol, part of the recovered ethanol may also be recycled to form acetaldehyde. Part of the ethanol vapors are withdrawn to condenser 60 and the condensate returned through pipe 61 as reflux for the column. Ethanol consumed in the process may be introduced through pipe 62 as part of the reflux required in the column. Water is discharged from the column through pipe 63, and its heat content may be recovered by suitable heat exchange in the system.

By means of the invention described, it has proved possible to remove the by-products at a rate commensurate with the rate of their formation in the reaction of ethanol with acetaldehyde to produce butadiene, and to prevent the accumulation of the by-products in the cyclic system through their return with the acetaldehyde distillate. This reduction in the amount of impurities recirculated has led to an increased production of butadiene and has avoided a source of catalyst contamination. A minimum amount of ethanol and acetaldehyde is discarded with the by-products, which fact increases the chemical efficiency of the process for making butadiene.

We claim:

1. A cyclic process for making butadiene which comprises passing ethanol and acetaldehyde over a catalyst to form a mixture including butadiene, acetaldehyde, diethyl ether and other by-products, continuously distilling such mixture to remove butadiene and to form a residue, and withdrawing a fraction containing acetaldehyde, diethyl ether and other by-products in such distillation at a section below the feed point and above the point of residue removal, the ratio of diethyl ether to acetaldehyde in such fraction being substantially greater than one to three by weight, mixing said fraction with water to partition the fraction between an aqueous phase and a non-aqueous phase, and distilling said aqueous phase and said residue to separate a distillate containing more than 75% by weight of acetaldehyde, and recycling said distillate over the catalyst.

2. A cyclic process for making butadiene which comprises passing ethanol and acetaldehyde over a catalyst to form a mixture including butadiene, acetaldehyde, diethyl ether and other by-products, continuously distilling such mixture to remove butadiene and to form a residue, and withdrawing a fraction containing acetaldehyde, diethyl ether and other by-products in such distillation at a section below the feed point and above the point of residue removal, the ratio of diethyl ether to acetaldehyde in such fraction being at least about one to one by weight, mixing said fraction with water in successive amounts to partition the fraction between an aqueous phase and a non-aqueous phase, and distilling said aqueous phase and said residue to separate a distillate containing more than 75% by weight of acetaldehyde, and recycling said distillate over the catalyst.

3. A cyclic process for making butadiene which comprises passing ethanol and acetaldehyde over a catalyst to form a mixture including butadiene, acetaldehyde, diethyl ether and other by-products, continuously distilling such mixture to form a residue and to remove butadiene vapors and a portion of the acetaldehyde, and withdrawing a fraction containing acetaldehyde, diethyl ether and other by-products in such distillation at a section below the feed point and above the point of residue removal, the ratio of diethyl ether to acetaldehyde in such fraction being substantially greater than one to three, washing said butadiene and acetaldehyde vapors with water to form a dilute aqueous solution of acetaldehyde, mixing this aqueous solution with said fraction to partition the fraction between two immiscible layers, distilling the layer having the higher specific gravity in admixture with said residue to separate a distillate containing more than 75% by weight of acetaldehyde and recycling said distillate over the catalyst.

4. A cyclic process for making butadiene which comprises passing ethanol and acetaldehyde over a catalyst to form a mixture including butadiene, acetaldehyde, diethyl ether and other by-products, continuously distilling such mixture to remove butadiene and to form a residue, and withdrawing a fraction containing acetaldehyde, diethyl ether and other by-products, in such distillation at a section below the feed point and above the point of residue removal, the ratio of diethyl ether to acetaldehyde in such fraction being substantially greater than one to three, mixing said fraction with water to partition the fraction between an aqueous phase and a non-aqueous phase, and distilling said aqueous phase and said residue to separate a distillate containing more than 75% by weight of acetaldehyde and a remainder containing by-products of lower volatility than diethyl ether, recycling the distillate over the catalyst, and distilling the remainder to separate a by-products portion, mixing said portion with water to distribute it between an aqueous component and a non-aqueous component, distilling the aqueous component to separate reactant materials, and recycling said reactant materials over the butadiene catalyst.

5. A cyclic process for making butadiene which comprises passing ethanol and acetaldehyde over a catalyst to form a mixture including butadiene, acetaldehyde, diethyl ether and other by-products, continuously distilling such mixture to remove butadiene and to form a residue, and withdrawing a fraction containing acetaldehyde, diethyl ether and other by-products, in such distillation at a section below the feed point and above the point of residue removal, the ratio of diethyl ether to acetaldehyde in such fraction being substantially greater than one to three, mixing said fraction with water to partition the fraction between an aqueous phase and a non-aqueous phase, and distilling said aqueous phase and said residue to separate a distillate containing more than 75% by weight of acetaldehyde and a remainder containing by-products of lower volatility than diethyl ether, recycling the distillate over the catalyst, and distilling the remainder to separate a by-products portion, and combining said by-products portion with said fraction in the water washing operation.

6. A cyclic process for making butadiene which comprises passing ethanol and acetaldehyde over a catalyst to form a mixture including butadiene, acetaldehyde, diethyl ether and other by-products, continuously distilling such mixture to remove butadiene and to form a residue, and withdrawing a fraction containing acetaldehyde, diethyl ether and other by-products, in such distillation at a section below the feed point and above the point of residue removal, the ratio of diethyl ether to acetaldehyde in such fraction being substantially greater than one to three, distilling such residue to separate a distillate containing more than 75% by weight of acetaldehyde and a remainder containing by-products, recycling the distillate over the catalyst and distilling such remainder in the presence of such fraction to separate a portion containing acetaldehyde, diethyl ether and other by-products, mixing said portion with water to partition it between an aqueous phase and a non-aqueous phase, and returning the aqueous phase to said residue distillation to recover acetaldehyde.

7. A cyclic process for making butadiene which comprises passing ethanol and acetaldehyde over a catalyst to form a mixture including butadiene, ethanol, acetaldehyde, diethyl ether and other by-products, continuously distilling such mixture to remove butadiene and to form a residue and withdrawing a fraction containing acetaldehyde, diethyl ether and other by-products in such distillation at a section below the feed point and above the point of residue removal, the ratio of diethyl ether to acetaldehyde in such fraction being substantially greater than one to three, mixing said fraction with water to partition the fraction between an aqueous phase and a non-aqueous phase, and distilling said aqueous phase and said residue to separate a distillate containing more than 75% by weight of acetaldehyde and a remainder containing by-products, recycling the distillate over the catalyst and distilling the remainder to remove such by-products from ethanol and water, distilling the ethanol and water to recover the ethanol and recycling such ethanol over the catalyst.

8. A cyclic process for making butadiene which comprises passing ethanol and acetaldehyde over a catalyst to form a mixture including butadiene, ethanol, acetaldehyde, diethyl ether and other by-products, continuously distilling such mixture to remove butadiene and to form a residue, and withdrawing a fraction containing acetaldehyde, diethyl ether, and other by-products in such distillation at a section below the feed point and above the point of residue removal, the ratio of diethyl ether to acetaldehyde in such fraction being substantially greater than one to three, mixing said fraction with water in successive amounts to partition the fraction between an aqueous phase and a non-aqueous phase, and distilling said aqueous phase and said residue to separate a distillate containing more than 75% by weight of acetaldehyde and a remainder containing by-products, recycling the distillate over the catalyst and distilling such remainder to remove such by-products, as compositions of different volatilities, from ethanol and water, distilling the ethanol and water to recover the ethanol and recycling such ethanol over the catalyst, and washing said compositions with water to recover acetaldehyde and ethanol.

9. A cyclic process for making butadiene which comprises passing ethanol and acetaldehyde over a catalyst to form a mixture including butadiene, ethanol, acetaldehyde, diethyl ether and other by-products, continuously distilling such mixture to remove butadiene and to form a residue, and withdrawing a fraction containing acetaldehyde, diethyl ether and other by-products in such distillation at a section below the feed point and above the point of residue removal, the ratio of diethyl ether to acetaldehyde in such fraction being substantially greater than one to three, mixing said fraction with water in successive amounts to partition the fraction between an aqueous phase and a non-aqueous phase, and distilling said aqueous phase and said residue to separate a distillate containing more than 75% by weight of acetaldehyde and a remainder containing by-products, recycling the distillate over the catalyst and distilling such remainder to remove such by-products, as compositions of different volatilities, from ethanol and water, distilling the ethanol and water to recover the ethanol and recycling such ethanol over the catalyst, combining the more volatile of such compositions with said fraction in the mixing of said fraction with water, washing the compositions of lower volatilities with water to form an aqueous component and a non-aqueous component, and returning the non-aqueous component to said first mixing operation.

JAY L. MARSH.
MELVILLE E. HITCHCOCK.